(No Model.)

D. Z. HUNTING.
WHEEL CULTIVATOR.

No. 461,184. Patented Oct. 13, 1891.

UNITED STATES PATENT OFFICE.

DAVE ZILIOUS HUNTING, OF VAN BUREN, ARKANSAS.

WHEEL-CULTIVATOR.

SPECIFICATION forming part of Letters Patent No. 461,184, dated October 13, 1891.

Application filed June 24, 1891. Serial No. 397,341. (No model.)

*To all whom it may concern:*

Be it known that I, DAVE ZILIOUS HUNTING, a citizen of the United States, residing at Van Buren, in the county of Crawford and State of Arkansas, have invented certain new and useful Improvements in Wheel-Cultivators; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention has relation to wheel-cultivators; and it consists in the novel construction and arrangement of its parts.

Figure 1:
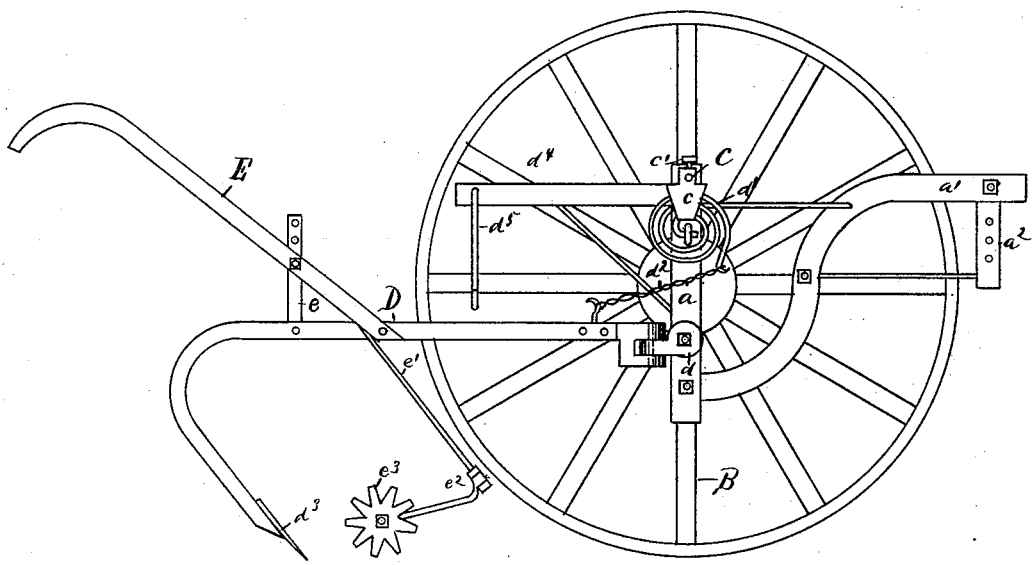
Figure 2:
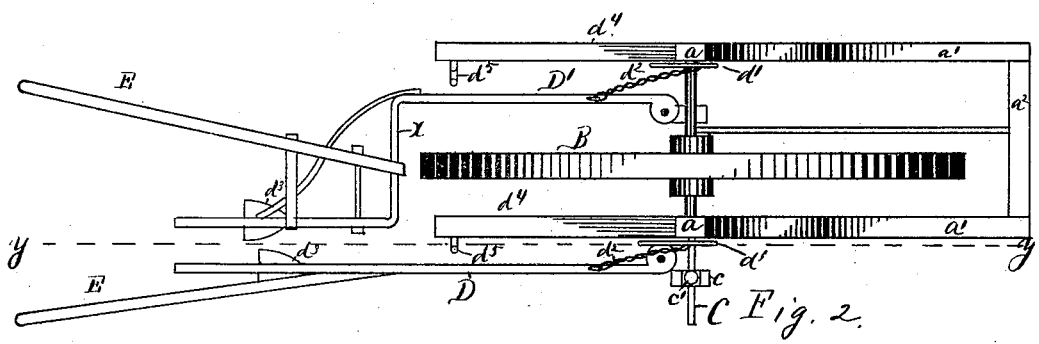

In the accompanying drawings, Figure 1 is a side view of my invention, and Fig. 2 is a top view of the same.

My invention is described as follows: It consists of a frame having the uprights $a$ and pieces $a'$, connected by the cross-piece $a^2$. Connecting the two uprights $a$ $a$ is an axle $b$, on which is journaled the wheel B, which is adapted to roll on the ground and support the weight of the cultivator. Near the top of the upright $a$, on the right of wheel B, is a rod C, extending out at right angles to said upright. On said rod is a weight $c$, held in place by a thumb-screw $c'$. This weight is adapted to slip back and forth on said rod and is used to balance the cultivator on wheel B. On the forward part of the pieces $a'$ and extending downward are perforated pieces $a^2$, to which may be attached a pair of shafts or other equivalent attachment for drawing the cultivator. A little below the axle $b$, on the upright $a$, is pivoted the part $d$, to which is hinged the plow-standard D. The pivoted part $d$ works up and down and the hinged part of the plow-standard works laterally, thus giving the standard lateral and perpendicular motion. To the standard $a$ is also attached a coil-spring $d'$, the end of which is connected by a chain $d^2$ to the standard D. The rear end of the standard D is bent down and terminates in a suitable rest for the plow-plate $d^3$. The handle E is secured to the said standard about midway between the hinged end and the bent end. Said handle is braced by an upright $e$, also secured to the said standard. The standard has also attached to it the downwardly-extending arm $e'$, to the lower end of which is pivoted a second arm $e^2$, on the free end of which is journaled the sod and root cutter $e^3$.

The construction of the standard D' is exactly similar to that of standard D, with the exception that the standard D' has the elbow $x$ in it to bring the two plow-plates close together, one on each side of the wheel, and also has attached to a downwardly-extended arm a root and sod cutter similar to that attached to standard D.

To the upper part of the uprights $a$ and extending backward are the arms $d^4$, to the rear ends of which are secured the hooks $d^5$, in which may be lodged the plow-standards D D' when they are not in use.

My invention is operated as follows: The wheel B runs along between the rows, and one plow-plate runs on one side of the row and the other on the other side of the row, and the sod-cutters $e^3$ run one in front of either plow-plate. The row is indicated by the dotted line $y$ $y$. (See Fig. 2.) Thus the crop can be cultivated without breaking down any of the plants.

Having described my invention, what I claim as new, and desire to secure by Letters Patent, is—

1. A cultivator consisting of a wheel B, journaled in a suitable frame having the uprights $a$, rod C, attached to one of the uprights $a$, weight $c$, and thumb-screw $c'$, adapted to work on said rod C, parts $d$, pivoted to uprights $a$, and standards D D', hinged to parts $d$, said standards having suitable plow-handles E and plates $d^3$, coil-spring $d'$, one end attached to upright $a$, and chain $d^2$, connecting the standards with the free end of said spring, substantially as shown and described.

2. A cultivator consisting of a wheel B, journaled in a suitable frame having the uprights $a$, parts $d$, pivoted to uprights $a$, and standards D D', hinged to parts $d$, said standards having suitable plow-handles E and plates $d^3$, coil-spring $d'$, one end attached to upright $a$, and chain $d^2$, connecting the standard with the free end of said spring, arms $e'$, extending down from the standards, and arms $e^2$, pivoted to arms $e'$, and sod-cutter $e^3$, substantially as shown and described.

In testimony whereof I affix my signature in presence of two witnesses.

DAVE ZILIOUS HUNTING.

Witnesses:
J. M. WEAVER, Jr.,
W. P. SADLER.